J. M. MEYERS.
VALVE.
APPLICATION FILED FEB. 1, 1917.

1,324,842.

Patented Dec. 16, 1919.

WITNESSES

INVENTOR
John Max Meyers
By Frsk W. Winter
Attorney

UNITED STATES PATENT OFFICE.

JOHN MAX MEYERS, OF WEST CHESTER, PENNSYLVANIA.

VALVE.

1,324,842.  Specification of Letters Patent.  Patented Dec. 16, 1919.

Application filed February 1, 1917. Serial No. 145,906.

*To all whom it may concern:*

Be it known that I, JOHN MAX MEYERS, a citizen of the United States, and a resident of West Chester, in the county of Chester and State of Pennsylvania, have invented a new and useful Improvement in Valves, of which the following is a specification.

This invention relates to valve mechanism, and particularly to such mechanism designed for use with a fluid pressure lifting jack such as described in my co-pending application Serial No. 763,132, filed April 23, 1913, or other uses when fluid under pressure is to be stored and used.
One object of the invention is to provide valve mechanism which is of simple construction and which nevertheless will prevent leakage of air or other gases, and which is capable of actuation to permit the passage of fluid pressure from a reservoir to a pressure chamber and of further actuation to release the pressure from such chamber without disturbing the connection to the reservoir, and by means of which the reservoir can be charged and the fluid withdrawn therefrom for use for various purposes. A further object of the invention is to provide valve mechanism with a safety feature comprising a member so constructed as to break and permit the escape of pressure when the latter exceeds the limit of safety.

Figure 1:
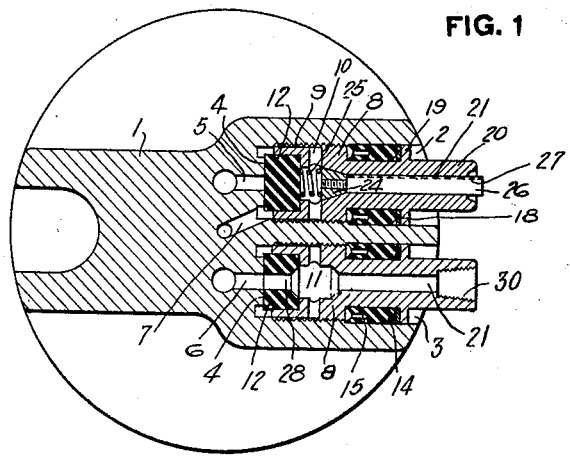
Figure 3:
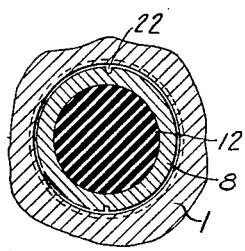
Figure 2:
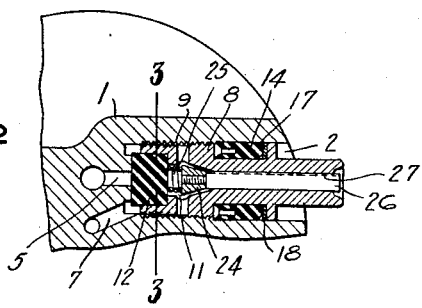
Figure 4:
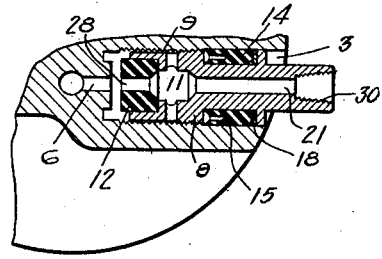
Figure 5:
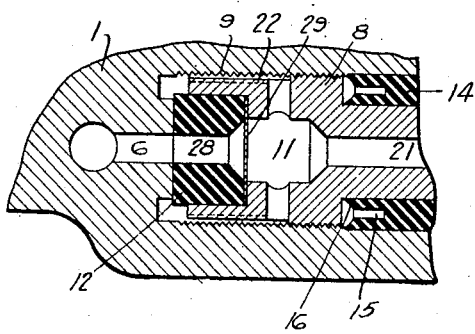
Figure 6:
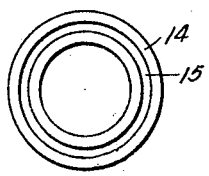
Figure 7:
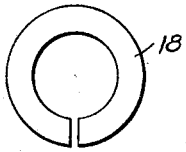

In the accompanying drawings, Figure 1 is a horizontal section through the valve mechanism; Fig. 2 is a similar section through the regulating and release valve showing the release valve moved to permit the escape of pressure; Fig. 3 is a cross section on the line 3—3, Fig 2; Fig. 4 is a longitudinal section through the charging and safety valve showing the same in charging position; Fig. 5 is an enlargement of a portion of the safety valve to show the safety device; Fig. 6 is an end view of one of the valve gaskets; and Fig. 7 is a plan view of the washer forming a seat for the gasket.

As shown in the drawings, 1 represents a suitable casting provided with a horizontal chamber or bore 2 for the regulating and release valve, and a corresponding bore 3 disposed in the same plane as the bore 2 for the safety and charging valve. Each of these bores or chambers has in its bottom a seat 4, the seat of the regulating valve being provided with a port 5 and that of the safety valve being provided with a port 6, both of which lead to a suitable reservoir of pressure fluid, such as gas, compressed air or the like. The inner end of the chamber 2 has also communicating therewith a passage 7 leading to a place of use of the pressure fluid.

The general construction of both valves is the same. Each comprises a body portion 8, which at its inner portion is externally threaded to engage threads 9 in the inner surfaces of the chambers 2 and 3 respectively. Each valve body is provided with a transverse passage 10 and a central cavity 11, and at its inner end is recessed to receive the disk 12 of suitable yielding material, preferably hard rubber, which forms the valve proper and engages the valve seat 4. Toward their outer ends the valve bodies are reduced to receive the packing gaskets or sleeves 14 which are formed as short sections of rubber or similar tubes which are grooved or split, as at 15, from one end partly through to the other end and having the edge portions of such grooves beveled, as at 16, in order to insure the pressure medium entering said grooves. The opposite ends of these gaskets are rounded, as at 17, and are seated against split washers 18 surrounding the reduced portion of the valve bodies and in turn seated against annular collars 19 thereon. Any fluid pressure tending to escape past this packing will enter the groove or slit 15 and spread the walls of said groove tightly against the walls of the chambers or bores in which the valves work. The heavier the pressure tending to escape the tighter will the packing be formed. The split washers 18 prevent the pressure from causing the gaskets to adhere to the collars 19, and hence assist in allowing free rotation of the valve bodies in the gaskets or packing. The outer ends of the valve bodies are reduced, as at 20, and are suitably formed to receive a wrench or other tool, or they may be provided with suitable means for rotating the valve bodies. Both valve stems are provided with longitudinal bores 21 extending inwardly to their central cavities 11, and are also provided with longitudinal grooves 22 cut through their threaded portions from their inner ends to the transverse passages 10.

As far as described both valves are identically the same. The regulating valve has the inner end of its central bore 21 shaped to form a conical seat to receive a conical release valve 24 which is normally held against such seat by a spiral spring 25 bearing against its base. This conical valve is secured to the threaded inner end of a stem 26 which extends outwardly slightly beyond the end of the main valve stem, so that it can be engaged by any suitable means and pressed inwardly to the position shown in Fig. 2. This valve stem fits loosely in the bore so that the fluid pressure can escape past the same when the valve 24 is unseated, but preferably will be either flattened or provided with a longitudinal groove, as shown at 27, to facilitate the escape of such fluid pressure.

The safety valve has its disk 12 provided with a central perforation 28, and interposed between its outer end and the chamber 11 is a breakable member consisting of a thin disk 29 of metal or other suitable material, which will be chosen of such strength that it will break when the pressure in the reservoir approaches the danger point. The outer end of the stem of the safety valve is internally threaded, as at 30, to permit of the attachment of a suitable hose or tube for either charging the reservoir or permitting air to be taken from the reservoir and used for other purposes, such as inflating a vehicle tire or the like.

When the regulating and release valve body is screwed outwardly it permits passage of fluid pressure from the reservoir through port 5 to the passage 7 leading to the place of use, without any danger of any such pressure being wasted, as the gasket surrounding the valve body prevents such escape and the release valve 24 is tightly held to its seat by the spring 25. When this valve is screwed inwardly the disk 12 closes the reservoir port 5, but does not close the passage 7. In case it is desired to release pressure from passage 7 it is merely necessary to press inwardly on the stem 26 and unseat valve 24, when the pressure from passage 7 will escape through the grooves 22, to transverse passages 10, to the central cavity 11 and thence out through the central bore around the stem 26. In this way it is possible to release pressure to any extent from the device to which it has been supplied from the reservoir without disturbing the reservoir connections, and therefore without danger of losing any reservoir pressure.

The safety valve can also be used for charging the reservoir. This can be done by screwing the valve outwardly somewhat, to the position shown in Fig. 4, and attaching a hose to the outer threaded portion 30 of the valve stem, whereupon pressure can be forced through the central bore of the stem to its central cavity 11 and thence through the transverse passages 10 and longitudinal grooves 22 to the reservoir port 6. In the same way, this valve when screwed outwardly to the position shown in Fig. 4 and having a hose attached thereto, can be utilized for supplying fluid pressure from the reservoir to some external source, such as for inflating a vehicle tire. Except when charging the reservoir or withdrawing fluid pressure from the reservoir for some external use, the safety valve will be fully seated, or in the position shown in Figs. 1 and 5. The breakable member 29 provides a suitable safety feature so that the pressure in the reservoir cannot exceed a safe limit.

The valve mechanism described comprises in its entirety two valves which are used conjointly, both being connected to the same source and one of which is arranged to supply pressure to some fixed place or device through the passage 7 and for releasing the pressure from such device, and the other of which is adapted for charging the reservoir and withdrawing fluid pressure from the reservoir for external use.

The construction of the valves is simple and they can be readily removed for repair or cleaning, and are so designed as to effectively prevent the waste of the fluid pressure medium by leakage. The wear on the parts is only slight, but it becomes immaterial in view of the form of gaskets used, which are so designed that the greater the pressure or the tendency of the fluid medium to escape, the tighter the joint becomes.

What I claim is:—

1. Valve mechanism comprising two valve seats connected to a reservoir, a valve coöperating with one of said seats and arranged to be manually actuated to release pressure from the reservoir, and a valve coöperating with the other of said seats and arranged upon excessive pressure in said reservoir to connect the same to the atmosphere.

2. Valve mechanism, comprising two valve seats connected to a source of pressure, a valve coöperating with one of said seats and arranged to permit passage of pressure from said source to a suitable pressure utilizing device and to release pressure from said utilizing device, and a valve coöperating with the other seat and arranged under excessive pressure to permit the escape of pressure.

3. Valve mechanism comprising two valve seats connected to a source of pressure, a valve coöperating with one of said seats and arranged to permit passage of pressure from said source to a suitable utilizing device, a valve seated in said first named valve and arranged to release pressure from said utilizing device, and a valve coöperating with the other seat and arranged upon excessive pressure in said source to connect the same to the atmosphere.

4. Valve mechanism comprising two valve seats connected to a source of pressure, a valve coöperating with one of said seats and arranged to permit passage of pressure from said source to a suitable pressure utilizing device and to release pressure from said utilizing device, and a valve coöperating with the other seat and provided with a member arranged to break under excessive pressure and permit escape of pressure.

5. Valve mechanism comprising two valve seats connected to a source of pressure, a valve coöperating with one of said seats and arranged to be rotated to permit passage of pressure to a suitable utilizing device, a valve in said first named valve arranged to be moved inwardly to release pressure from said utilizing device, and a valve coöperating with the other seat and arranged under excessive pressure to permit the escape of pressure.

6. Valve mechanism comprising two valve seats connected to a source of pressure, a valve coöperating with one of said seats and arranged to be rotated to permit passage of pressure to a suitable utilizing device, a valve in said first named valve arranged to be moved inwardly to release pressure from said utilizing device, and a valve coöperating with the other seat and provided with a member arranged to break under excessive pressure and permit the escape of pressure.

7. Valve mechanism comprising a valve casing connected to a source of pressure, and a valve comprising a member provided with a passage for fluid pressure and having a loose fit in said casing and arranged in open position of the valve to open communication from said source of pressure to a suitable pressure utilizing device, said valve including means to permit escape of pressure from said pressure utilizing device.

8. Valve mechanism comprising a valve casing connected to a source of pressure, a valve comprising a member provided with a passage for fluid pressure and having a loose fit in said casing and arranged in open position to establish communication from said source of pressure to a pressure utilizing device, said valve including means to permit escape of pressure from said pressure utilizing device, and a gasket on said valve member split annularly from one end thereof.

9. Valve mechanism comprising a valve casing connected to a source of pressure, a valve comprising a member having a loose fit in said casing and arranged in open position to establish communication from said source of pressure to a suitable pressure utilizing device and in closed position to permit escape of pressure from said pressure utilizing device, a gasket on said valve split annularly from one end thereof, and a release valve in said valve member arranged to be actuated to permit the escape of pressure to the atmosphere.

10. Valve mechanism comprising a valve casing connected to a reservoir, a valve therein, a gasket on said valve split annularly from one end thereof, said valve having a loose connection with the casing to permit passage of pressure in charging the reservoir, and a member in said valve arranged to break under excessive pressure.

11. Valve mechanism comprising a valve casing connected to a reservoir, a valve in said casing having a loose connection with the casing to permit passage of pressure in charging said reservoir, and a member in said valve arranged to break under excessive pressure.

12. Valve mechanism comprising a valve casing connected to a reservoir, a valve therein, and a gasket on said valve split annularly from one end thereof, said valve provided with a passage for fluid pressure and having a loose connection with the casing and arranged when open to permit passage of pressure in charging said reservoir and when closed to retain pressure therein.

In testimony whereof, I have hereunto set my hand.

JOHN MAX MEYERS.

Witnesses:
 ELBERT L. HYDE,
 SUE B. FRITZ.